United States Patent [19]

Harris et al.

[11] 4,314,647

[45] Feb. 9, 1982

[54] STORAGE AND DISPLAY ELEVATOR

[75] Inventors: Jack W. Harris, 1194 Houston Mill Rd. N.E., Atlanta, Ga. 30320; Walter H. Eskew, Marietta, Ga.

[73] Assignee: Jack W. Harris, Marietta, Ga.

[21] Appl. No.: 165,144

[22] Filed: Jul. 1, 1980

[51] Int. Cl.³ .............................................. A47F 3/11
[52] U.S. Cl. .................................. 211/121; 198/798; 312/268
[58] Field of Search ............... 211/121; 312/134, 268; 198/798, 800

[56] References Cited

U.S. PATENT DOCUMENTS

| | | | |
|---|---|---|---|
| 832,986 | 10/1906 | Levalley | 198/798 |
| 851,021 | 4/1907 | Murray . | |
| 1,270,001 | 6/1918 | Boos et al. | 198/798 |
| 1,680,035 | 8/1928 | Buckingham | 312/268 X |
| 1,757,819 | 5/1930 | Taylor . | |
| 1,873,391 | 8/1932 | Haish et al. . | |
| 1,978,205 | 10/1934 | Ide | 312/96 |
| 2,603,547 | 7/1952 | Zook | 312/268 X |
| 2,609,112 | 9/1952 | McKenzie | 214/16.1 |
| 3,610,614 | 10/1971 | Nishizawa | 272/7 |
| 4,171,042 | 10/1979 | Meissner | 198/386 |

Primary Examiner—Roy D. Frazier
Assistant Examiner—Robert W. Gibson, Jr.
Attorney, Agent, or Firm—Jones, Thomas & Askew

[57] ABSTRACT

The storage and display elevator includes a series of movable shelves or platforms suspended from a pair of continuous chains, with the chains extending about upper and lower pairs of sprocket wheels. At least one upper guide sprocket is rotatably supported beneath one of the upper sprocket wheels, and a similar lower guide sprocket is rotatably supported beneath one of the lower sprocket wheels, and a lower portion of each storage and display platform engages the teeth of the guide sprockets as the platforms move about the peripheries of the sprocket wheels, from the front to the rear, or from the rear to the front of the flights of the chains. Vertical cam tracks extend parallel to the flights of the chains, and cam followers engage the vertical cam tracks during vertical movement and engage the teeth of the guide sprockets during arcuate movement from a front to a rear flight or from a rear to a front flight.

8 Claims, 5 Drawing Figures

STORAGE AND DISPLAY ELEVATOR

BACKGROUND OF THE INVENTION

This invention relates to a storage and display elevator of the type which includes a series of platforms suspended on conveyor chains, with the conveyor chains extending about upper and lower pairs of rotatable sprockets, whereupon the platforms can be moved vertically and articles placed on the platforms can be stored and/or displayed in various positions about the elevator.

In certain fields of merchandising, a large stock of goods must be maintained in order to supply prospective customers with the various sizes, styles and colors available for each product. For example, a typical retail shoe store must stock shoes in multiple sizes and colors for each style shoe. This requirement is burdensome to the store proprietor in that a substantial amount of space is required to store the merchandise, and the merchandise is not immediately accessible to the customer or to the clerk serving a customer. Usually, one shoe of a pair of shoes is placed on display in a customer area, and the customer must ask a clerk to bring out the proper size and color of a particular style shoe. The clerk is required to leave the presence of the customer to search for the particular requested style, size and color, and during the absence of the clerk, the customer and all other customers in the store are not in the presence of the clerk, and the clerk cannot continue with his attempt to sell to the customer or to tend to other business in the customer area. Thus, a relatively small amount of service and sales contact in available from each clerk, and a relatively large number of clerks are required to tend to the retail business.

Various storage and display elevators have been developed in the past wherein articles are stored and displayed to retail customers. The prior art storage and display elevators usually comprise a pair of conveyor chains extending about pairs of vertically spaced sprockets, and a series of platforms suspended at their ends from the conveyor chains. When the platforms are moved laterally about the upper and lower sprockets, the lateral movement usually results in the platforms swinging back and forth like pendulums as the platforms are moved along their vertical paths. Usually, the articles most suitable for placement in a vertical storage and display elevator are small and light weight, such as jewelry, and the vertical storage and display elevator is also of a relatively small size and light in weight, with the vertical paths of the shelves being spread apart a substantial distance. The light weight platforms and articles minimize the tendency of the platforms to swing. When larger, heavier articles are placed on the storage and display platforms, the platforms tend to swing with greater amplitude as they are moved through the elevator system, creating a hazard of a clash between platforms moving in opposite directions on different flights of the conveyor chains of the system, and a hazard of damage to the articles stored and displayed in the vertical elevator.

In order to reduce the swinging of the storage and display platforms and the articles placed thereon, it has been found necessary to either slow down the movement of the platforms so as to reduce the tendency of the platforms and articles to swing as they are moved, or to positively guide the platform as they move through the elevator system. Of course, slowing the movement of the storage and display platforms is detrimental to the effect of the elevator system in that it requires more time to retrieve or otherwise handle the articles in the system. Also, when articles are placed on a storage and display platform, the articles may have their center of gravity off-set from the center of gravity of the shelf, causing the shelf to tilt in the elevator system. The tilting of one shelf may cause the tilted shelf to clash with another shelf as the shelves move with respect to one another.

SUMMARY OF THE INVENTION

Briefly described, the present invention comprises a storage and display elevator wherein various articles of commerce can be safely stored on vertically movable platforms, and the platforms can be moved to an area of display where the articles can be observed, retrieved or otherwise handled, and to a position vertically displaced from the display and retrieval area where the articles can be stored. The storage and display platforms are each suspended at their ends on a pair of continuous conveyor chains, and the conveyor chains are extended about upper and lower pairs of rotatable sprocket wheels. Guide sprockets are placed beneath at least one of each of the upper and lower sprocket wheels, and vertically extending cam tracks extend in vertical tangential alignment between the peripheries of the guide sprockets. Cam followers on each storage and display platform engage the cam tracks during vertical movement between the upper and lower sprocket wheels and engage the guide sprockets during arcuate movement between the upper and lower paths of movement, so that the shelves are positively retarded from any swinging movements during the normal up, down and arcuate movements of the platforms in the elevator system.

The upper and lower guide sprockets are rotated in unison with the upper and lower pairs of sprockets wheels so as to positively engage and move the cam followers of each storage and display platform as the platforms move with the conveyor chains about the sprocket wheels.

Thus, it is an object of this invention to provide a storage and display elevator which can be used by a retail merchant for efficiently storing and displaying articles, so that some of the articles can be displayed at a suitable level for a customer to observe and to handle the articles while others of the articles can be displayed vertically for storage.

Another object of this invention is to provide a storage and display elevator which is inexpensive to construct and maintain, which is simple to operate, and which is effective to expediently display or to store various items which are offered for sale in a retail store, or the like.

Another object of this invention is to provide a means for storing and displaying a large stock of retail merchandise in a small floor area.

Other objects, features and advantages of the present invention will become apparent upon reading the following specification, when taken in conjunction with accompanying drawings.

DETAILED DESCRIPTION

Figures 1, 3:
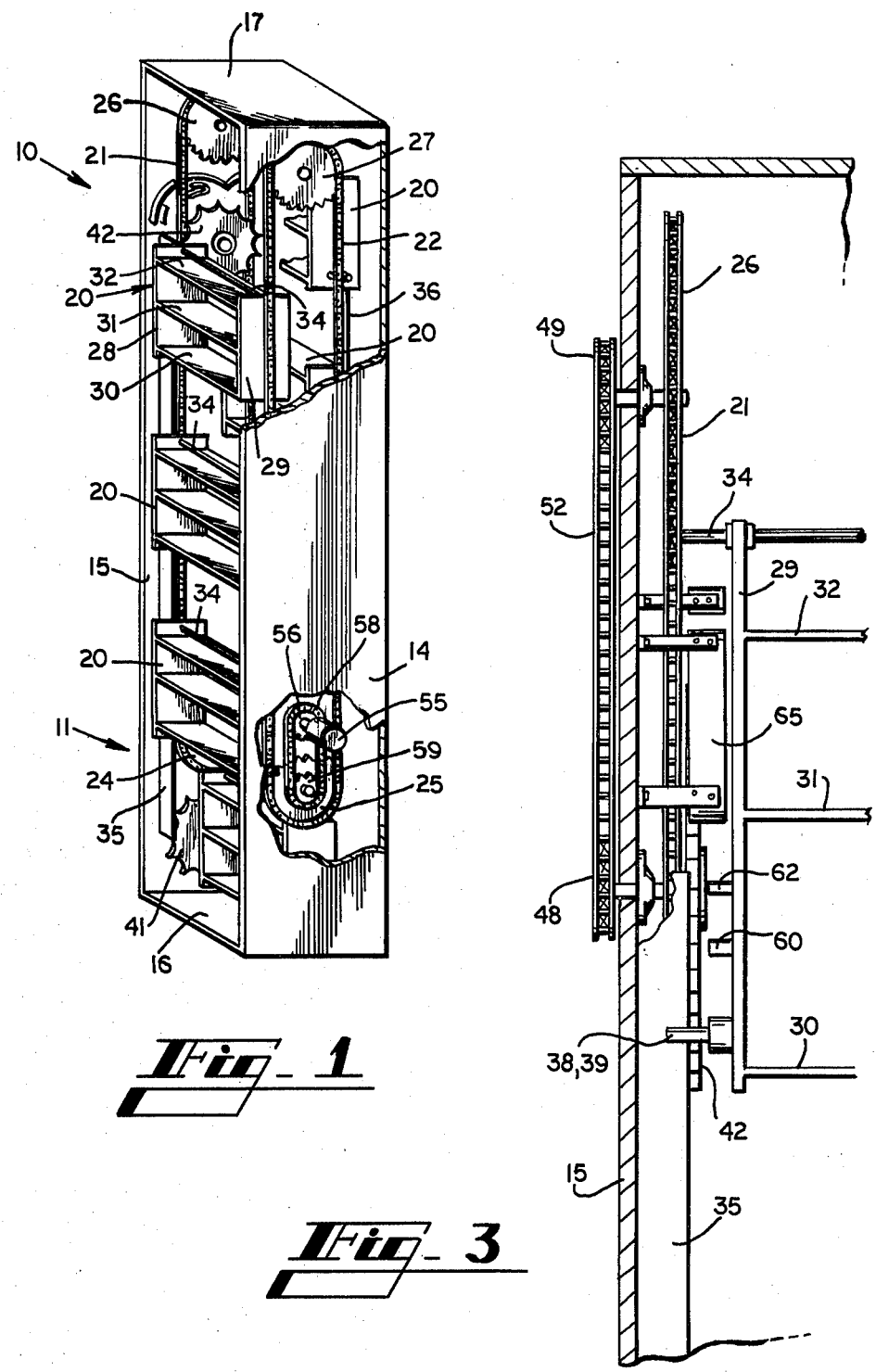
FIG. 1 is a perspective view of the storage and display elevator.
FIG. 3 is an end cross-sectional view of one upper side portion of the storage and display elevator.

Referring now in more detail to the drawings, in which like numerals indicate like parts throughout the several views, FIG. 1 illustrates the storage and display elevator 10 which includes a substantially rectangular support frame 11. Support frame 11 is illustrated as being fabricated of sheet material, but it will be understood that the support frame can be formed of various beams in a skeletal form or can be formed in a decorative manner with internal skeletal members covered by outer sheet material, etc. In general, the support frame includes sidewall sections 14 and 15, botton section 16 and top section 17. If desired, back and front walls (not shown) can be mounted to the sidewall sections 14 and 15 to enclose the support frame. Moreover, various openings can be formed in the front and back walls, and doors such as opaque or transparent doors can be mounted to selectively open and close the openings. These features usually will be determined by the particular environment in which the storage and display elevator 10 is to be used.

For example, if the storage and display elevator is to be used in an adult retail shoe store, the support frame may be mounted adjacent a wall so that its rear portion does not require a back wall, and the front portion of the elevator may be fitted with upper and lower front wall sections which leave an access opening from waist to shoulder height that enables a customer or clerk to reach into the support frame and to retrieve merchandise therefrom.

A plurality of storage and display platforms or shelves 20 are positioned in support frame 11. Each platform 20 is mounted at its opposite ends to a continuous chain 21 and 22, and the chains 21 and 22 are extended about lower and upper pairs of sprocket wheels 24, 25 and 26, 27. The sprocket wheels 24–27 are each rotatably supported by support frame 11, with sprocket wheels 24, 25 being coaxial and mounted on a common axle, and with sprocket wheels 26, 27 being coaxial and mounted on stub shafts, and with sprocket wheels 24, 26 being located in the same plane, and with sprocket wheels 25, 27 being located in the same plane. Thus, chains 21, 22 extend in parallel planes.

Figure 2:
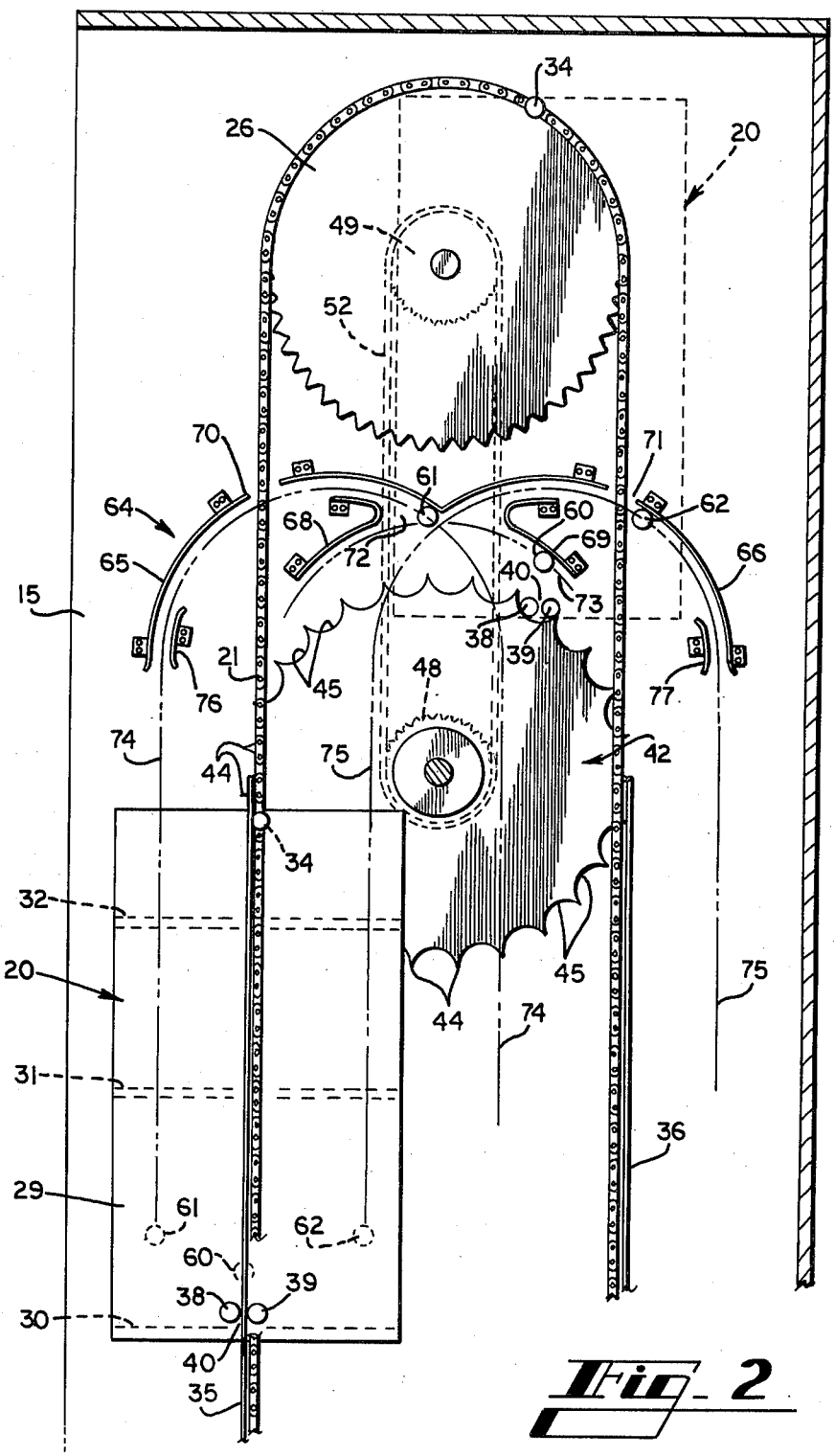
FIG. 2 is a side cross-sectional view of the upper portion of the storage and display elevator.

As illustrated in FIGS. 1 and 2, each storage and display platform 20 includes vertical side walls 28, 29 that are spaced from each other and which are parallel with respect to each other and horizontal shelves such as lower shelf 30, intermediate shelf 31 and upper shelf 32. The number and positions of the horizontal shelves 30–32 can be modified, as may be desired for the particular goods to be stored and displayed. An upper connecting rod 34 extends horizontally across the upper portion of each platform 20, through the upper portion of the side walls 28, 29, and the end portions of the connecting rods 34 are connected to a link of each chain 21, 22. Thus, each storage and display platform 20 is suspended in an upright attitude at its opposite ends from chains 21, 22, so that the lower portion of each storage and display platform 20 tends to swing like a pendulum about its connecting rod 34.

Vertically extending cam tracks 35, 36 are mounted to one side wall of support frame 11, and cam track 35 extends tangentially between the peripherial portions of the lower guide sprocket 41 and the upper guide sprocket 42, and cam track 36 is positioned on the opposite side of the guide sprockets and also extends tangentially between the peripheral portions of the lower and upper guide sprockets. The cam tracks 35, 36 are positioned outside chain 21, immediately adjacent the vertical paths of the chain. A pair of guide means 38, 39 in the form of rollers or the like are mounted to side wall 29 of each storage and display platform 20, and the space 40 between the guide rollers 38 and 39 is sized to closely fit about cam tracks 35, 36. Thus, the guide rollers 38, 39 are normally positioned on opposite sides of cam track 35 during vertical movement of the storage and display platforms 20, thus functioning as guide means to guide the lower portions of the platforms 20 during vertical movement of the platforms, so as to retard any tendency of the platforms to swing about their respective connecting rods 34.

Figures 4, 5:
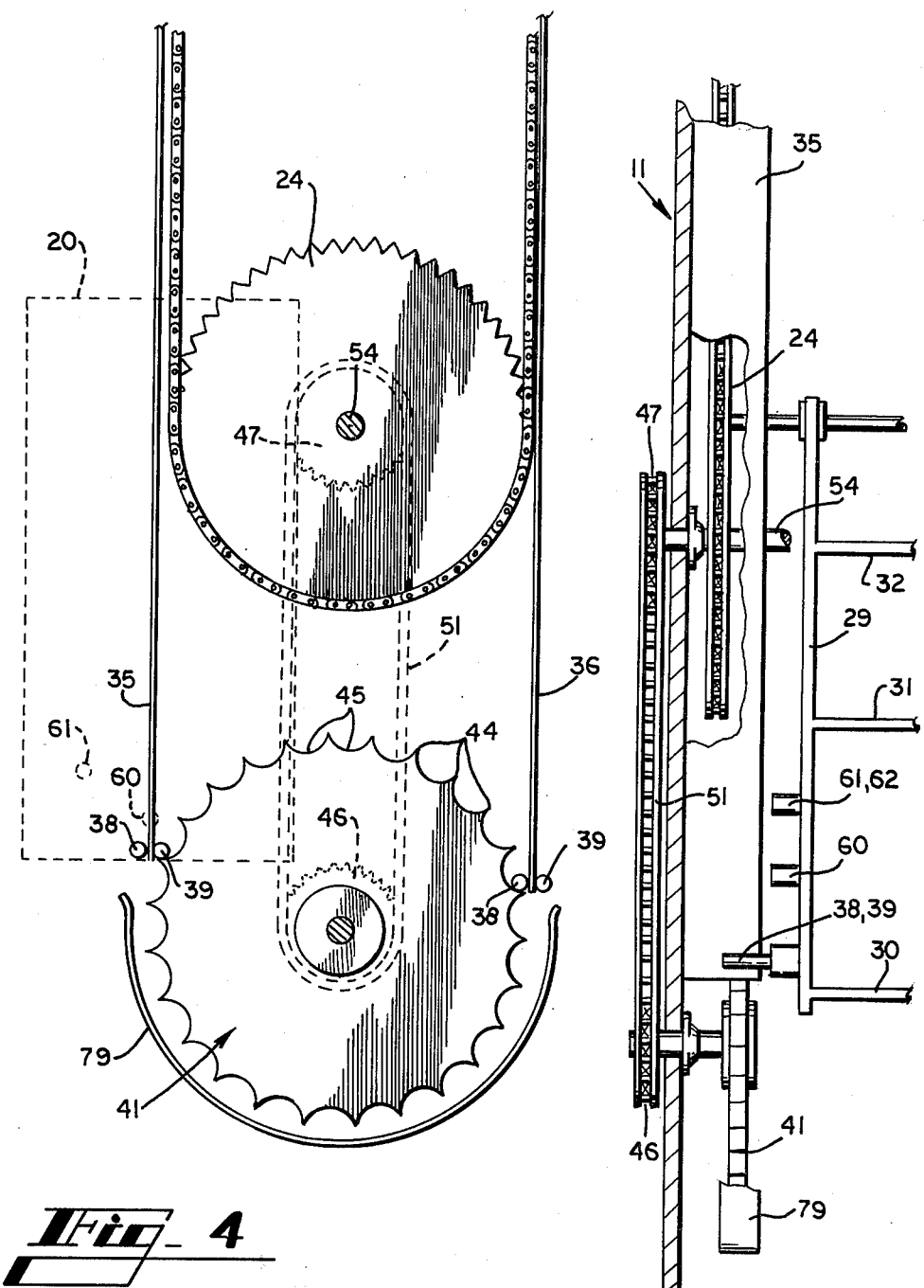
FIG. 4 is a side cross-sectional view of the lower portion of the storage and display elevator.
FIG. 5 is a front cross-sectional view of one lower side portion of the storage and display elevator.

As illustrated in FIGS. 2 and 4, lower and upper guide sprockets 41 and 42 are rotatably mounted in support frame 11 on side wall section 15 at positions beneath lower and upper sprocket wheels 24, 26. Each guide sprocket 41, 42 includes a series of widely spaced teeth 44 and intervening recesses 45, with the recesses 45 being large enough to accommodate both guide rollers 38, 39 of each storage and display platform 20.

Timing sprockets 46, 47 are rigidly connected to lower guide sprocket 41 and lower sprocket wheel 24, respectively, while timing sprockets 48, 49 are rigidly connected to upper guide sprocket 42 and upper sprocket wheel 26. Timing chains 51 and 52 extend about timing sprockets 46, 47 and 48, 49 respectively, so that guide sprockets 41, 42 are driven in unison with lower and upper sprocket wheels 24, 26. Axle 54 is rigidly connected at its ends to lower sprocket wheels 24, 25. Thus, both chains 21, 22 are driven in unison. Drive motor 55 is mounted in support frame 11, and its driven sprocket 56 drives chain 58, and chain 58 extends about and drives sprocket 59 of lower sprocket wheel 25. Since lower guide sprocket 41 is connected by timing chain 51 of lower sprocket wheel 24, motor 55 functions as means for rotating the various sprocket wheels and for moving the conveyor chains.

Each storage and display platform 20 includes three cam followers 60, 61 and 62. Cam followers 60 are positioned at the lower central portion of each platform while the second two cam followers 61, 62 are positioned on opposite sides of and above the lower cam follower 60, in a triangular relationship. Arcuate cam tracks 64 are supported by side wall section 15 in the area generally between upper sprocket wheel 26 and upper guide sprocket 42. Arcuate cam tracks 64 comprise a pair of arcuate entry cams 65 and 66 and a pair of holding cams 68, 69. Cams 65, 66, 68 and 69 are all formed with a radius of curvature substantially equal to the radius of curvature of upper sprocket wheel 26. The center of curvature of each of the arcuate entry cams 65, 66 is off-set from the axis of rotation of upper sprocket wheel 26 a direction and distance equal to the off-set of cam followers 61, 62 from connecting rod 34. Thus, as each storage and display platform 20 moves on its chains 21, 22 about the upper arcuate portion of upper sprocket wheel 26, the cam followers 61, 62 will move into contact with the concave surfaces of the arcuate entry cams 65, 66. In the meantime, the guide rollers 38, 39 at the lower portion of the storage and display platform will have moved off the upper end of a cam track 35, 36. Thus, just as the storage and display platform 20 loses its stability by virtue of the guide rollers 38, 39 leaving a cam track 35 or 36, one of the arcuate entry cams 65 or 66 will engage a cam follower 61 or 62 to cause the guide rollers 38, 39 to be urged into a space 45 between the teeth 44 of guide sprocket 42. In this manner, the guide rollers 38, 39 are positively urged by guide sprocket 42 to move in an arcuate path identical to but spaced vertically below the arcuate path formed by the upper portion of sprocket wheel 26.

Both arcuate entry cams 65 and 66 are broken at 70, 71, so as to permit the chain 21 to move connecting rod 34 through the cam tracks. Thus, the arcuate entry cams 65, 66 lose control of cam followers 61, 62 as the cam followers move past the flights of the chain 21; however, holding cams 68, 69 are located at the path of lower cam follower 60 and engage lower cam follower 60 during the time when the cam followers 61 or 62 move past the gaps 70 or 71 of the entry cams 65, 66, thus holding the guide rollers 38, 39 in a recess 45 of the guide sprocket 42. The gap 72 between holding cams 68, 69 and entry cams 65, 66 permits the passage therebetween of cam followers 61, 62.

The movements of cam followers 60, 61 and 62 are indicated by the dash lines 73, 74 and 75, respectively. Exit cams 76 and 77 are located in inwardly spaced relationship with respect to entry cams 65, 66, and tend to stabilize the lower portions of the storage and display platforms 20 as the guide rollers 38, 39 move onto the upper ends of cam tracks 35, 36.

As illustrated in FIGS. 4 and 5, the lower ends of cam tracks 35, 36 extend tangentially to the peripherial portion of lower guide sprocket 41 and lower cam track 79 extends about the lower peripherial arcuate portion of lower guide sprocket 41, to urge the guide rollers 38, 39 into the recesses 45 between the teeth 44. It will be noted from FIGS. 2 and 4 that the guide rollers 38, 39 maintain their horizontal attitude as they travel about the arcuate portions of guide sprocket 41 and 42, but that the recesses 45 of the guide sprockets progressively change their attitudes as the guide sprockets rotate, thus causing a progressive change in relationship of the guide rollers 38, 39 with respect to the recesses 45. Should there be any lateral forces applied to the storage and display platform 20 moving about lower guide sprocket 41 that would tend to move the guide rollers 38, 39 out of their recesses 45, the lower cam track 79 tends to retard any such movement and the lower guide sprocket 41 will positively engage and move the guide rollers 38, 39.

From the preceeding description, it will be understood that the guide sprockets, tracks and cams of the storage and display elevator maintain the storage and display platforms 20 in their proper upright attitudes during movement in the elevator, without regard to abrupt acceleration or deceleration of the platforms.

While this invention has been disclosed for the express purpose of storing and displaying articles of commerce such as shoes, it will be understood by those skilled in the art that the invention can be utilized for storing and displaying various other articles, and the invention can be used for storing without display, if desired. Moreover, the storage and display elevator has been illustrated as being formed in certain proportions, but it will be understood that the proportions and dimensions are not to be limited to the disclosed embodiment, and that, for example, the height of the elevator can be shortened or extended as may be desired without changing the other structural components or the operation of the elevator.

While this invention has been described in detail with particular reference to a preferred embodiment thereof, it will be understood that variations and modifications can be effected within the spirit and scope of the invention as described hereinbefore and as defined in the appended claims.

We claim:

1. A storage and display elevator comprising a support frame, an upper pair of sprocket wheels mounted in said support frame in spaced coaxial relationship with respect to each other, a lower pair of sprocket wheels mounted in said support frame in spaced coaxial relationship with respect to each other and in vertical alignment with said upper pair of sprocket wheels, a pair of endless chains positioned in parallel planes and each extending about one of said upper and one of said lower sprocket wheels and each forming parallel upwardly extending chain flights, means for rotating said sprocket wheels and moving said chains in unison, a plurality of storage and display platforms connected to said chains in approximately equally spaced relationship along the lengths of said chains, said platforms including connecting rods extending therefrom and said connecting rods being attached to said endless chains whereby the platforms are pivotably suspended from said chains, guide rails supported by said support frame and extending vertically along the vertical runs of at least one of said endless chains, an upper guide sprocket positioned below an upper sprocket wheel and rotatable about an axis parallel to the axis of rotation of said upper pair of sprocket wheels, cam means positioned below said upper sprocket wheels and extending from said support frame beyond the plane of an adjacent endless chain toward the path of movement of said platforms and including arcuate entry cams positioned on opposite sides of said adjacent endless chain and an arcuate holding cam positioned inside the upwardly extending chain flights of said adjacent endless chain whereby gaps are formed between said entry cams and said holding cam for the passage of the connecting rods of the platforms, said platforms each including a pair of guide means protruding laterally therefrom at a level below the connecting rod of the platform toward the plane of the adjacent endless chain for engagement with said guide rails, a first cam follower protruding laterally therefrom at a level above said pair of guide means, and a pair of cam followers protruding laterally therefrom on opposite sides of said first cam follower; whereby the guide means protruding from said platforms engage and move along a guide rail of one vertical run of an endless chain as the platforms are moved vertically, and as the platforms begin to move about the upper pair of sprocket wheels an arcuate entry cam engages one of the pair of cam followers and urges the pair of guide means into engagement with the upper guide sprocket, and as the platform continues its movement about the guide sprocket, the holding cam engages the first cam follower and maintains the pair of guide means in engagement with the upper guide sprocket, and then the other arcuate entry cam engages the other of the pair of cam followers and maintains the pair of guide means in engagement with the upper guide sprocket until the platform begins its downward vertical movement and the pair of guide means engage and follow the guide rail of the other vertical run of the endless chain.

2. The storage and display elevator of claim 1 and further including a lower guide sprocket positioned below said lower sprocket wheel and rotatable about an axis parallel to the axis of rotation of said lower pair of sprocket wheels for engaging and guiding the lower portions of said platforms as each platform moves on said chains about the lower arcs of said lower sprocket wheels, and means for rotating said upper and lower guide sprockets in unison with respect to the rotation of said upper and lower pairs of sprocket wheels.

3. The storage and display elevator of claim 1 and wherein said first cam follower and said pair of cam followers of each said storage and display platform are arranged in a triangular relationship with respect to each other with said first cam follower positioned at a lower central portion of the platform and with said pair of cam followers positioned above and on opposite sides of said first cam follower, and wherein said upper guide sprocket has a radius approximately equal to the radius of said upper sprocket wheels and said arcute entry cams are of a radius of curvature approximately equal to the radius of said upper guide sprocket and are arranged to engage said pair of cam followers and to urge said guide means of each platform toward engagement with said upper guide sprocket, said holding cam comprising a pair of holding cams of a radius of curvature approximately equal to the radius of said upper sprocket wheel and each positioned inside the flights of said one chain for engaging said first cam follower when one of said pair of cam followers is positioned in the gap of an arcuate entry cam and for maintaining said guide means of each platform in engagement with said upper guide sprocket.

4. A storage and display elevator comprising a support frame, upper and lower pairs of sprocket wheels rotatably mounted in said support frame, a pair of endless chains each extending about an upper sprocket wheel and a lower sprocket wheel and each chain including vertically extending chain flights, means for rotating said sprocket wheels in unison, a plurality of storage and display platforms positioned between said chains, connector rods connecting each of said platforms to said chains whereby each platform is pivotably suspended from said chains and moves with said chains about a closed path, a guide sprocket of a radius approximately equal to the radius of an upper sprocket wheel and positioned below an upper sprocket wheel and rotatable about an axis parallel to the axis of rotation of said upper sprocket wheels, a vertically extending guide rail positioned adjacent each vertically extending chain flight of at least one of said chains, arcuate entry cams supported by said support frame at a level below the upper sprocket wheels and extending from said support frame beyond the adjacent chain toward the path of movement of the platforms and positioned outside the flights of the chain, and an arcuate holding cam supported by said support frame at a level between the upper sprocket wheels and said guide sprocket and extending from said support frame beyond said adjacent chain toward the path of movement of the platforms, said arcuate entry cams and said arcuate holding cam forming gaps therebetween for the movement of the connector rods of said platforms, and each of said platforms including cam followers extending therefrom with a first cam follower positioned beneath the connector rod of each platform and a pair of cam followers positioned on opposite sides of said first cam follower at positions to follow said arcuate entry cams, each said platform also including a pair of guide means positioned beneath said first cam follower and beneath the connector rod of the platform at a distance corresponding to the vertical distance between the axes of rotation of said upper sprocket wheels and said guide sprocket to engage and move along the vertically extending guide rails whereby the guide means of each platform move along the vertically extending guide rails as the platforms move vertically toward and away from the upper sprocket wheels, and as the platforms begin and finish movement about the upper sprocket wheels one of the pair of cam followers engages and follows an arcuate entry cam whereby the guide means are urged toward engagement with the guide sprocket, and as the platforms move about the upper sprocket wheels the first cam follower engages the arcuate holding cam whereby the first guide means are maintained in engagement with the guide sprocket.

5. The storage and display elevator of claim 4 and wherein said guide rails extend tangentially between the peripheral portions of an upper and a lower sprocket wheel, and wherein said guide means straddle said guide rails as the platforms are moved vertically with said chains and engage said guide sprocket as the platforms are moved with said chains about the upper portions of said upper pair of sprocket wheels.

6. The storage and display elevator of claim 4 and further including a lower guide sprocket positioned below one of said lower sprocket wheels for engaging and guiding the lower portions of said storage and display platforms as the platforms are moved with said chains about the lower portions of said lower pair of sprocket wheels.

7. The storage and display elevator of claim 4 and wherein said pair of guide means comprise a pair of laterally spaced rollers for straddling said vertically extending cam tracks, and wherein said guide sprocket includes teeth about its periphery with the spaces between said teeth being sufficient to receive said pair of rollers.

8. A storage and display elevator comprising a support frame, upper and lower pairs of sprocket wheels rotatably mounted in said support frame, a pair of endless chains each extending about an upper sprocket wheel and a lower sprocket wheel, means for rotating said sprocket wheels in unison, a plurality of storage and display platforms extending between and suspended from said chains, movable guide means positioned below at least one of said upper sprocket wheels for engaging and moving the lower portion of each of said platforms as each platform is moved on said chains about the upper portions of said upper sprocket wheels, vertical guide rails extending parallel to the flights of one of said chains, a pair of guide means carried at one end of each platform for straddling said guide rails, cam followers also carried at said one end of each platform, arcuate entry cams supported by said support frame for engaging a cam follower of each platform and urging the pair of guide means toward engagement with said movable guide means, and an arcuate holding cam for engaging another cam follower of each platform and maintaining the pair of guide means in engagement with said movable guide means.

* * * * *